United States Patent
Nam et al.

(10) Patent No.: US 11,405,915 B2
(45) Date of Patent: Aug. 2, 2022

(54) ADAPTATION OF THE NUMBER OF NR PDCCH CANDIDATES

(71) Applicant: QUALCOMM Incorporated, San Diego, CA (US)

(72) Inventors: Wooseok Nam, San Diego, CA (US); Olufunmilola Omolade Awoniyi-Oteri, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 16/513,310

(22) Filed: Jul. 16, 2019

(65) Prior Publication Data

US 2020/0029330 A1 Jan. 23, 2020

Related U.S. Application Data

(60) Provisional application No. 62/699,851, filed on Jul. 18, 2018.

(51) Int. Cl.
*H04W 72/04* (2009.01)
*H04W 84/04* (2009.01)

(52) U.S. Cl.
CPC ..... *H04W 72/0453* (2013.01); *H04W 72/042* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2011/0205978 A1* | 8/2011 | Nory | H04L 5/0007 370/329 |
| 2011/0243059 A1* | 10/2011 | Liu | H04L 5/0032 370/315 |
| 2018/0139735 A1 | 5/2018 | Akkarakaran et al. | |

FOREIGN PATENT DOCUMENTS

| | | | | |
|---|---|---|---|---|
| EP | 2 566 091 A1 | 6/2008 | | |
| EP | 2566091 A1 * | 3/2013 | ......... | H04L 5/0094 |

OTHER PUBLICATIONS

International Search Report and Written Opinion—PCT/US2019/042277—ISA/EPO—dated Jan. 27, 2020.
Partial International Search Report issued in PCT/US2019/042277 dated Nov. 7, 2019.

* cited by examiner

*Primary Examiner* — Shripal K Khajuria
(74) *Attorney, Agent, or Firm* — Arent Fox, LLP

(57) ABSTRACT

A user equipment (UE) in communication with a base station may receive downlink control information (DCI) on a physical downlink control channel (PDCCH). The UE may receive a configuration of the PDCCH. The UE may determine a number of downlink PDCCH candidates and a number of uplink PDCCH candidates within a search space based on the configuration, wherein the number of downlink PDCCH candidates is different than the number of uplink PDCCH candidates, and a length of each downlink PDCCH candidate is different than a length of each uplink PDCCH candidate. The UE may blindly decode the search space with each PDCCH candidate as a hypothesis to determine whether any of the downlink PDCCH candidates or uplink PDCCH candidates decode to a DCI format.

30 Claims, 9 Drawing Sheets

| CCE Aggregation Level | Rel-15 320 | | Adaptive Configuration 310 | |
|---|---|---|---|---|
| | DL Candidates | UL Candidates | DL Candidates | UL Candidates |
| 1 | 0 | 0 | 0 | 0 |
| 2 | 0 | 0 | 0 | 0 |
| 4 | 4 | 4 | 4 | 0 |
| 8 | 2 | 2 | 2 | 0 |
| 16 | 1 | 1 | 1 | 1 |
| Total Candidates | 14 | | 8 | |

FIG. 3

| CCE Aggregation Level | Configuration 1 | | Configuration 2 | | ... | Configuration N | |
|---|---|---|---|---|---|---|---|
| | DL Candidates | UL Candidates | DL Candidates | UL Candidates | | DL Candidates | UL Candidates |
| 1 | 0 | 0 | 0 | 0 | | 0 | 0 |
| 2 | 0 | 0 | 0 | 0 | | 0 | 0 |
| 4 | 4 | 0 | 4 | 4 | | 1 | 1 |
| 8 | 2 | 0 | 2 | 2 | | 1 | 1 |
| 16 | 1 | 1 | 1 | 1 | | 1 | 1 |
| Total Candidates | 8 | | 14 | | | 6 | |

400 → ; 410 → Configuration 1; 420 → Configuration 2; 430 → Configuration N

*FIG. 4*

ADAPTATION OF THE NUMBER OF NR PDCCH CANDIDATES

CLAIM OF PRIORITY UNDER 35 U.S.C. § 119

This application claims priority to U.S. Provisional Application No. 62/699,851 titled "ADAPTATION OF THE NUMBER OF NR PDCCH CANDIDATES," filed Jul. 18, 2018, which is assigned to the assignee hereof, and incorporated herein by reference in its entirety.

BACKGROUND

Aspects of the present disclosure relate generally to wireless communication networks, and more particularly, to physical layer transmissions using multiple code words.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

Wireless communication systems are typically configured to communicate various control information between devices. For example, control information may be sent in OFDM symbols according to a control channel resource set (coreset) configuration that includes a set of physical resource blocks (PRBs). Such configurations provide frequency diversity by spreading the control information (e.g., physical downlink control channel (PDCCH) information) over the coreset. Conventionally, the control information is communicated using a number of control resources at the beginning of a slot (or mini-slot), such as using the first three symbols (or control symbols) of the slot (or mini-slot).

For example, for NR communications technology and beyond, current control channel solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of receiving downlink control information (DCI) on a physical downlink control channel (PDCCH). The method may include receiving a configuration of the PDCCH. The method may include determining a number of downlink PDCCH candidates and a number of uplink PDCCH candidates within a search space based on the configuration. The number of downlink PDCCH candidates is different than the number of uplink PDCCH candidates, and a length of each downlink PDCCH candidate is different than a length of each uplink PDCCH candidate. The method may include blindly decoding the search space with each PDCCH candidate as a hypothesis to determine whether any of the downlink PDCCH candidates or uplink PDCCH candidates decode to a DCI format.

In an aspect, the disclosure provides a user equipment (UE) for receiving DCI on a PDCCH via wireless communication. The UE may include a memory; and a processor in communication with the memory. The processor may be configured to receive a configuration of the PDCCH. The processor may be configured to determine a number of downlink PDCCH candidates and a number of uplink PDCCH candidates within a search space based on the configuration. The number of downlink PDCCH candidates is different than the number of uplink PDCCH candidates, and a length of each downlink PDCCH candidate is different than a length of each uplink PDCCH candidate. The processor may be configured to blindly decode the search space with each PDCCH candidate as a hypothesis to determine whether any of the downlink PDCCH candidates or uplink PDCCH candidates decode to a DCI format.

In another aspect, the disclosure provides a UE for receiving DCI on a PDCCH via wireless communication. The UE may include means for receiving a configuration of the PDCCH. The UE may include means for determining a number of downlink PDCCH candidates and a number of uplink PDCCH candidates within a search space based on the configuration. The number of downlink PDCCH candidates is different than the number of uplink PDCCH candidates, and a length of each downlink PDCCH candidate is different than a length of each uplink PDCCH candidate. The UE may include means for blindly decoding the search space with each PDCCH candidate as a hypothesis to determine whether any of the downlink PDCCH candidates or uplink PDCCH candidates decode to a DCI format.

In another aspect, the disclosure provides a computer-readable medium storing computer code executable by a processor for receiving DCI on a PDCCH via wireless communications. The computer-readable medium may include code to receive a configuration of the PDCCH. The computer-readable medium may include code to determine a number of downlink PDCCH candidates and a number of uplink PDCCH candidates within a search space based on the configuration. The number of downlink PDCCH candidates is different than the number of uplink PDCCH candidates, and a length of each downlink PDCCH candidate is different than a length of each uplink PDCCH candidate. The computer-readable medium may include code to blindly decode the search space with each PDCCH candidate as a hypothesis to determine whether any of the downlink PDCCH candidates or uplink PDCCH candidates decode to a DCI format.

In another aspect, the disclosure provides a method of changing a configuration of a PDCCH for a UE. The method may include determining a need for resources outside of a search space defined by the configuration of the PDCCH for the UE or unused resources within the search space. The method may include transmitting an activation request to a serving base station. The method may include monitoring the search space for an activation command. The method may include monitoring a modified search space indicated by the activation command.

The disclosure also provides a UE including a memory and a processor for performing the above method, a UE including means for performing each element of the above method, and a computer-readable medium including computer-executable code for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 3 is a diagram comparing an example adaptive PDCCH configuration with an existing PDCCH configuration.

FIG. 4 is diagram showing multiple example PDCCH configuration templates.

DETAILED DESCRIPTION

Figure 1:
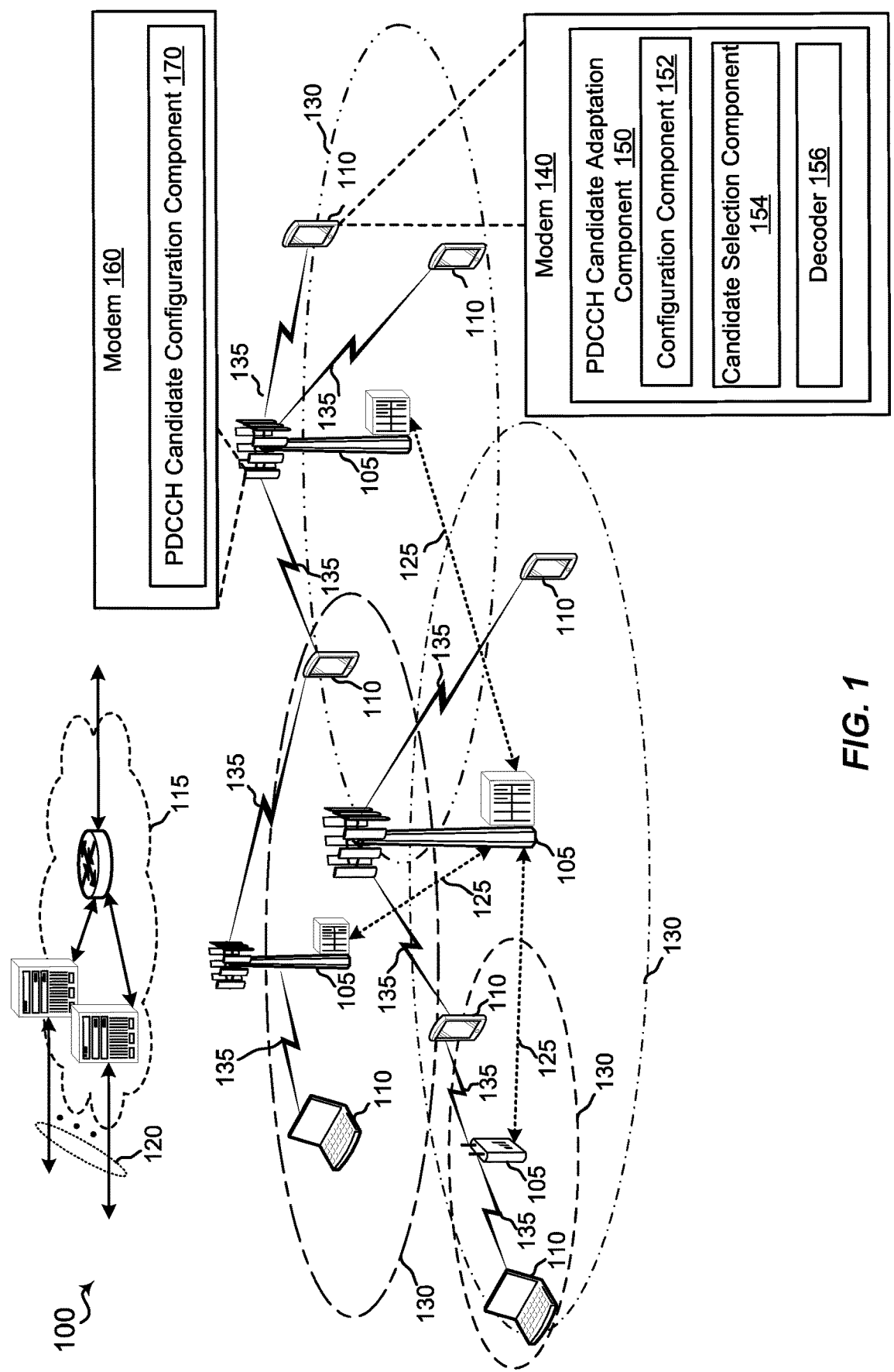
FIG. 1 is a schematic diagram of an example wireless communication network including at least one user equipment (UE) having a PDCCH candidate adaptation component configured according to this disclosure to receive a PDCCH.

Various aspects are now described with reference to the drawings. In the following description, for purposes of explanation, numerous specific details are set forth in order to provide a thorough understanding of one or more aspects.

It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to decoding a control channel such as a PDCCH. A UE may monitor a search space of the PDCCH for one or more messages. A search space may be a set of resources (e.g., PRBs that are transmitted over a number of OFDM symbols within the corset) that is indicated for one or more types of messages. Because the UE has little prior information about the message, the UE may perform blind decoding of the search space based on possible message candidates. For example, a PDCCH candidate may be associated with a control channel element (CCE) aggregation level, downlink control information (DCI) size, and demodulation reference signal (DM-RS) scrambling sequence. If the CCE aggregation level, DCI size, and DM-RS scrambling sequence are the same for two messages, the two messages may be considered a single candidate and a single decoding attempt may be used. For example, 3GPP TS 38.212 v. 15.0 indicates that DCI messages with formats 0_0 and 1_0 have the same size, and also use the same CCE aggregation level and DM-RS scrambling sequence. If the message is successfully decoded, the individual message may be interpreted according to a format identifier field within the message.

In contrast, when the CCE aggregation level, DCI size, and DM-RS scrambling sequence of two messages are different, the messages may be considered separate PDCCH candidates, and the UE may perform separate blind decoding attempts. For example, 3GPP TS 38.212 v. 15.0 indicates that DCI messages with formats 0_1 and 1_1 may have different lengths. 3GPP TS 38.213 v. 15.0 indicates that DCI messages with formats 0_1 and 1_1 may be transmitted in the same search space. 3GPP TS 38.213 v. 15.0 further indicates that an equal number of PDCCH candidates are used for DCI messages with formats 0_1 (uplink) and 1_1 (downlink). In many cases, downlink and uplink traffic are asymmetric. In view of the foregoing, however, the UE may need to perform the same amount of blind decoding for downlink PDCCH candidates and uplink PDCCH candidates. In the case of asymmetric traffic, some of the blind decoding efforts may be unnecessary. For example, in the common scenario of heavy downlink traffic with little uplink traffic, even though the UE does not have any uplink data to transmit, the UE may monitor the same number of PDCCH candidates for uplink as downlink. The unnecessary blind decoding may incur unnecessary power consumption and reduce opportunities to place the UE in a sleep mode due to longer decoding times. Additionally, the maximum number of PDCCH candidates in either direction is limited by the equal division between uplink and downlink.

The present disclosure provides techniques for adaptation of the number of PDCCH candidates. Adaptation of the number of PDCCH candidates may be used to reduce a number of unnecessary blind decoding attempts and to increase a maximum number of PDCCH candidates for traffic in a particular direction. Accordingly, the disclosed techniques may reduce power consumption of the UE, for example, by allowing the UE to enter a sleep mode. The disclosed techniques may also increase a data rate by increasing the number of PDCCH candidates available for scheduling traffic in the particular direction.

In an aspect, the UE may receive a configuration that indicates a number of downlink PDCCH candidates and a different number of uplink PDCCH candidates. The configuration may be for a message format where a downlink DCI and an uplink DCI have different lengths. The configuration may indicate the exact number of each candidate type, or may indicate a relationship of the candidate types (e.g., a scaling factor or ratio). In an aspect, the indicated configuration may be an anchor set of candidates and one or more additional second sets of candidates may be activated on demand to provide additional candidates, for example, in a direction with higher traffic amounts. In another aspect, the configuration may indicate a set of templates with a number of candidates for each direction. The network may dynamically change the template as needed. For example, the UE may request a specific template or the network may select a template based on, for example, quality of service (QoS), power status, channel conditions, or traffic.

In another aspect, the UE may pad or truncate a DCI format length such that uplink and downlink DCI have the same length. For example, if the raw sizes of DCI format 0_1 and DCI format 1_1 are different due to configured fields, the shorter DCI format may be zero-padded or the longer DCI format may be truncated to make the final size the same. This technique may be similar to DCI formats 0_0 and 1_0 having the same length. Due to the same size, the DCI formats may be mapped to a single PDCCH candidate. After blind decoding, a downlink/uplink identification field can be used to distinguish between the two formats.

Additional features of the present aspects are described in more detail below with respect to FIGS. 1-9.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes a 5G NR system for purposes of example, and 5G NR terminology is used in much of the description below, although the techniques are applicable beyond 5G NR applications (e.g., to other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a PDCCH candidate adaptation component 150 that receives a downlink DCI on the PDCCH based on a variable number of PDCCH candidates. The PDCCH candidate adaptation component 150 may include a configuration component 152 for receiving a configuration of the PDCCH and requesting search space modifications, a candidate selection component 154 for determining a number of downlink PDCCH candidates and a number of uplink PDCCH candidates within a search space based on the configuration, and a decoder 156 for blindly decoding the search space with each PDCCH candidate as a hypothesis. Further, wireless communication network 100 includes at least one base station 105 with a modem 160 having a PDCCH candidate configuration component 170 that dynamically configures PDCCH candidates and transmits the PDCCH. Thus, according to the present disclosure, the UE 110 may receive a PDCCH configuration indicating a number of PDCCH candidates in each direction and may receive the PDCCH according to the configuration.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.), which may be wired or wireless communication links. The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), media access control (MAC), etc.), may perform packet segmentation and reassembly to communicate over logical channels. For example, a MAC layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels. In an aspect, the PDCCH candidate adaptation component 150 may operate at the physical layer for channel decoding. Signaling for the PDCCH candidate adaptation component 150 may occur at any of the PHY, MAC, or RRC layers.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
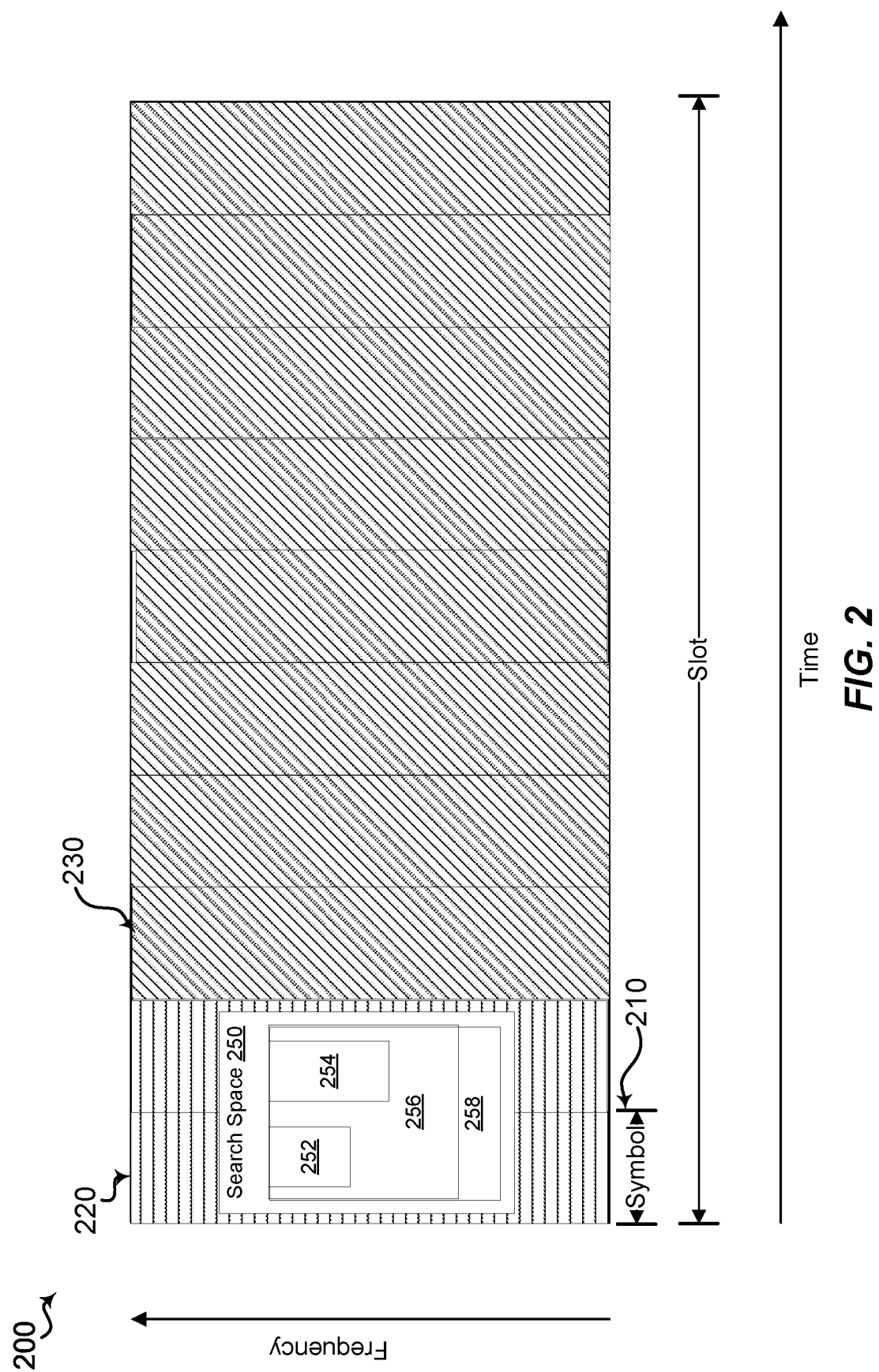
FIG. 2 is a resource diagram of an example slot including a PDCCH and a search space with multiple PDCCH candidates.

Turning to FIG. 2, an example of a slot 200 includes a PDCCH 220 and a data portion 230. In the time domain, the slot 200 may include multiple eMBB symbol periods 210. For example, the illustrated slot 200 includes 10 symbol periods 210. In the frequency domain, the bandwidth may be divided into sub-carriers. An OFDM numerology may include a combination of a symbol period and sub-carrier spacing that produces orthogonal symbols. The combination of sub-carrier and symbol period may be referred to as a resource element (RE), which may be allocated by a base station 105. A group of REs (e.g., 12 REs) may be grouped into resource element groups (REGs). The PDCCH 220 may utilize control channel elements, which may be a group of REGs (e.g., 6 REGs). Further, the PDCCH 220 may utilize CCE aggregation, which may use multiple CCEs known as aggregation levels to carry a PDCCH message. The PDCCH search space at an aggregation level is defined by a set of PDCCH candidates. A UE 110 may have relatively little information for receiving PDCCH 220 as compared to the data portion 230 because the PDCCH 220 carries the information for transmitting or receiving data channels. The UE 110 may be configured by higher layers (e.g., RRC) with a search space set, which may indicate where the UE 110 should search for PDCCH messages and a type of message (e.g., one or more DCI formats). In an aspect, the search space set may indicate two or more DCI formats of different lengths. The UE 110 search for PDCCH messages using blind decoding on a search space. For example, the search space set may indicate a search space 250. The UE 110 may decode candidates 252, 254, 256, and 258 within the search space 250. The candidates 252, 254, 256, and 258 may each be a potential format for a PDCCH message. By blind decoding the search space 250 with each candidate 252, 254, 256, and 258 as a hypothesis, the UE 110 may detect a message when the decoding is successful. The candidates 252, 254, 256, and 258 may utilize different overlapping resources within the search space 250. For example, the candidate 252 may be a message with a first format (e.g., DCI format 0_1) and the candidate 254 may be a message with a second format (e.g., DCI format 1_1). The candidates 252 and 254 may have the same level of CCE aggregation. Similarly, the candidates 256 and 258 may correspond to the same messages with the first format and the second format, but may have a different level of CCE aggregation. Accordingly, the UE 110 may attempt to decode each of the candidates 252, 254, 256, and 258 to determine whether a message for the UE 110 was transmitted and what format the message uses.

In a case with asymmetric traffic, one or more candidates for DCI formats for the direction with less traffic may be unnecessary. For example, when uplink traffic is less than downlink traffic, DCI format 0_1 corresponding to uplink traffic may not need both candidates 252 and 256. Accordingly, adaptation may be used to reduce the number of candidates that the UE 110 needs to decode (e.g., blind decode).

FIG. 3 is a diagram 300 comparing an adaptive configuration 310 to an existing configuration 320 based on 3GPP TS 38.213 v. 15.0. The configuration 320 may include an equal number of PDCCH candidates at each of CCE aggregation levels 4, 8, and 16 for a total of 14 candidates equally divided between uplink and downlink. In contrast, the adaptive configuration 310 may include 4 downlink candidates and 0 uplink candidates at CCE aggregation level 4, 2 downlink candidates and 0 uplink candidates at CCE aggregation level 8, and 1 downlink candidate and 1 uplink candidate at CCE aggregation level 8. Accordingly, the adaptive configuration 310 may include a total number of 8 candidates. The adaptive configuration 310 may be suitable for a downlink heavy traffic scenario (e.g., compared to uplink traffic) and reduce the total number of decoding operations.

In an aspect, the adaptive configuration 310 may be an anchor set of candidates for a search space, e.g., search space 250. The UE 110 may only monitor PDCCH candidates in the anchor set initially. Monitoring of additional PDCCH candidates (e.g., all candidates in configuration 320) may be triggered on-demand. For example, the UE 110 may receive an activation command to activate the additional PDCCH candidates. The activation may use different signaling methods. For example, the activation command may be received as a special DCI format or radio network temporary identifier (RNTI), or a MAC control element (MAC-CE). The activation command may be delivered via the anchor set within the same search space, or by an anchor set in another search space in the same or different carrier. Deactivation of an additional search space may be accomplished by on-demand triggering. For example, the network may deliver a deactivation command via DCI format or MAC-CE signaling. In another aspect, deactivation may be based on an inactivity timer. For example, if the additional candidates do not carry a message for a given number of slots, the additional candidates may be deactivated until another activation command is received.

FIG. 4 is a diagram 400 of multiple candidate configuration templates 410, 420, 430 that may be dynamically selected. The candidate configuration templates 410, 420, 430 may be predetermined and specified in a standard, or may be signaled by the network, for example, as system information. Each candidate configuration template 410, 420, 430 may specify configuration parameters for a search space. For example, each candidate configuration template 410, 420, 430 may specify a different combination of uplink and downlink PDCCH candidates. For example, the configuration template 410 may correspond to the adaptive configuration 310 and the configuration template 420 may correspond to the configuration 320. The configuration template 430 may include one candidate for each of uplink and downlink at each of CCE aggregation levels 4, 8, and 16, for a total of six candidates. Additional configuration templates may specify different combinations of candidates.

When the UE 110 establishes a connection with a base station 105, one of the configuration templates 410, 420, 430 may be initially activated as an anchor candidate set for the search space. When the UE 110 desires additional uplink or downlink candidates, the UE 110 may request a specific configuration template 410, 420, 430 to be activated or deactivated. For example, the UE 110 may determine the requested configuration template based on QoS, power status, or traffic. Similarly, the network (e.g., base station 105) may choose to activate a configuration template from the pre-configured templates with or without a UE request.

Figure 5:
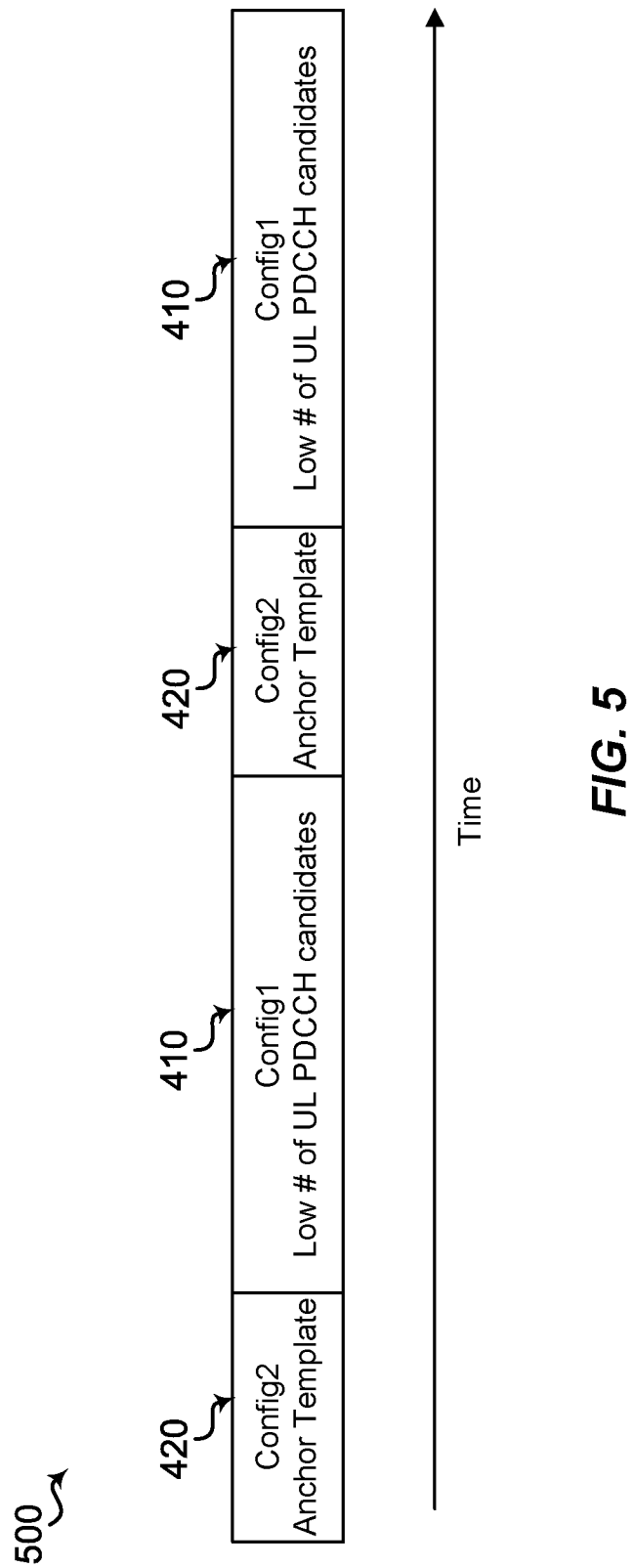
FIG. 5 is diagram showing example periodic PDCCH configuration changes.

In an aspect, the base station 105 may activate two or more configuration templates 410, 420, 430 in a time-division arrangement using a periodic pattern. FIG. 5 is a diagram 500 of an example periodic pattern of configuration templates. As illustrated, the configuration template 420 may alternate with the configuration template 410. Each configuration template may have a different periodicity, period, or activation duration. For example, the configuration template 420 may serve as an anchor template that flexibly allows candidates for either direction. The configuration template 410 may be used for a relatively longer time than the configuration template 420 and may provide a low number of uplink PDCCH candidates (e.g., 1 uplink PDCCH candidate per slot) to reduce the number of decoding attempts. Accordingly, the total number of decoding attempts may be reduced while having a minimal or reduced impact on the ability to schedule uplink transmissions.

Figure 6:
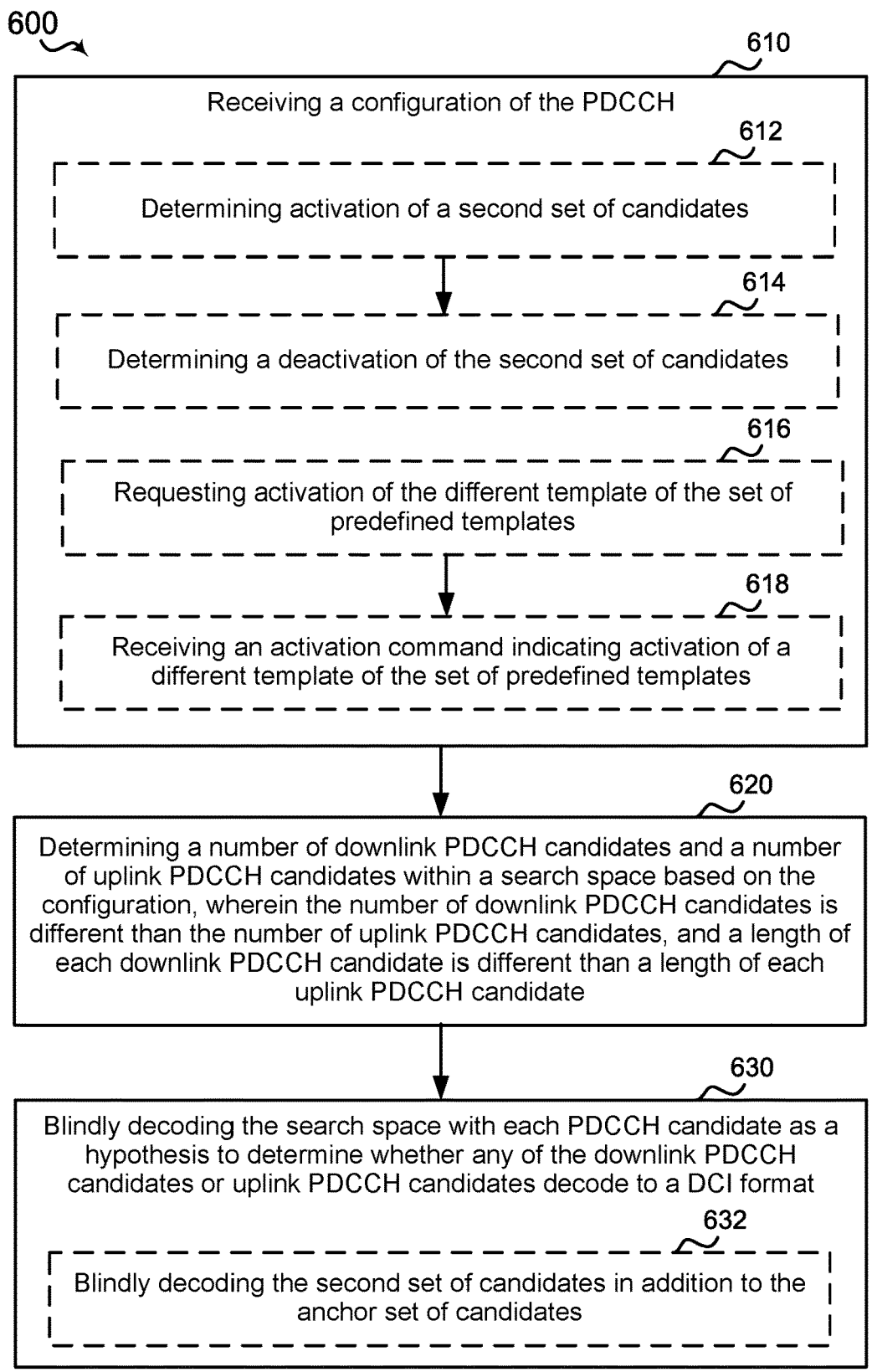
FIG. 6 is a flow diagram of an example of a method of receiving a PDCCH using an adaptive configuration.

Referring to FIG. 6, for example, a method 600 of wireless communication in operating UE 110 according to the above-described aspects to receive a PDCCH is provided. The method 600 may be performed by a UE 110 including a PDCCH candidate adaptation component 150 in conjunction with a base station 105, which may include a PDCCH candidate configuration component 170

For example, at block 610, the method 600 includes receiving a configuration of the PDCCH. In an aspect, for example, the UE 110 may execute the PDCCH candidate adaptation component 150 and/or the configuration component 152 to receive a configuration of the PDCCH. In an aspect, the configuration of the PDCCH specifies a number of downlink PDCCH candidates and a number of uplink PDCCH candidates or a ratio of downlink PDCCH candidates to uplink PDCCH candidates. In another aspect, the configuration of the PDCCH specifies a template including a defined number of downlink PDCCH candidates and a defined number of uplink PDCCH candidates.

In another aspect, the number of downlink PDCCH candidates and the number of uplink PDCCH candidates indicated by the configuration of the PDCCH is an anchor set of candidates. For example, at sub-block 612, the block 610 may include determining an activation of a second set of candidates. For example, the configuration component 152 may further determine activation of a second set of candidates. The second set of candidates may be added to the anchor set of candidates for decoding, as discussed in further detail below. Additionally, at sub-block 614, the block 610 may include determining deactivation of the second set of candidates. For example, the configuration component 152 may determine deactivation of the second set of candidates. Further details of activation and deactivation are described below with respect to FIG. 7.

In another aspect, the configuration includes an indication of a set of predefined templates, each template specifying a combination of downlink PDCCH candidates and uplink PDCCH candidates. One of the predefined templates may be an initial anchor template. The UE 110 may use the initial anchor template as a configuration of PDCCH candidates. At sub-block 616, the block 610 may include requesting activation of a different template of the set of predefined templates. For example, the configuration component 152 may request activation of a different template of the set of predefined configuration templates 410, 420, 430. For example, the UE 110 may request the different template based on QoS, power status, or traffic. Further details of example techniques for transmitting a request are described below with respect to block 720 of FIG. 7. At sub-block 618, the block 610 may include receiving an activation command indicating activation of the different template of the set of predefined templates. For example, the configuration component 152 may receive an activation command indicating activation of the different template of the set of predefined templates. The sub-block 618 may be in response to the request in sub-block 616, or may be initiated by the base station 105 without a specific request. Further details of example techniques for receiving an activation are described below with respect to block 730 of FIG. 7.

At block 620, the method 600 includes determining a number of downlink PDCCH candidates and a number of uplink PDCCH candidates within a search space based on the configuration. The number of downlink PDCCH candidates is different than the number of uplink PDCCH candidates, and a length of each downlink PDCCH candidate is different than a length of each uplink PDCCH candidate. In an aspect, for example, the UE 110 may execute the PDCCH candidate adaptation component 150 and/or the candidate selection component 154 to determine the number of downlink PDCCH candidates and the number of uplink PDCCH candidates within the search space (e.g., search space 250) based on the configuration.

At block 630, the method 600 may include blindly decoding the search space with each PDCCH candidate as a hypothesis to determine whether any of the downlink PDCCH candidates or uplink PDCCH candidates decode to a DCI format. In an aspect for example, the UE 110 may execute the PDCCH candidate adaptation component 150 and/or the decoder 156 to decode the search space 250 with each PDCCH candidate 252, 254, 256, 258 as a hypothesis to determine whether any of the downlink PDCCH candidates or uplink PDCCH candidates decode to a DCI format. For example, blind decoding may include attempting to decode the search space 250 based on a number of bits in the candidate, a CCE aggregation level of the candidate, and a DM-RS of the candidate. If the decoding is successful, the decoded result may be interpreted as a DCI according to the format of the candidate. Accordingly, the UE 110 may receive the DCI on the PDCCH 220 within the search space 250. In an aspect where a second additional set of candidates is activated (e.g., in sub-block 612), block 630 may include, at sub-block 632, blindly decoding the search space according to the second set of candidates in addition to the anchor set of candidates. In an aspect, for example, the decoder 156 may blindly decode the search space according to the second set of candidates in the same manner as decoding the anchor set of candidates. Accordingly, a DCI may be received in the second set of candidates.

Figure 7:
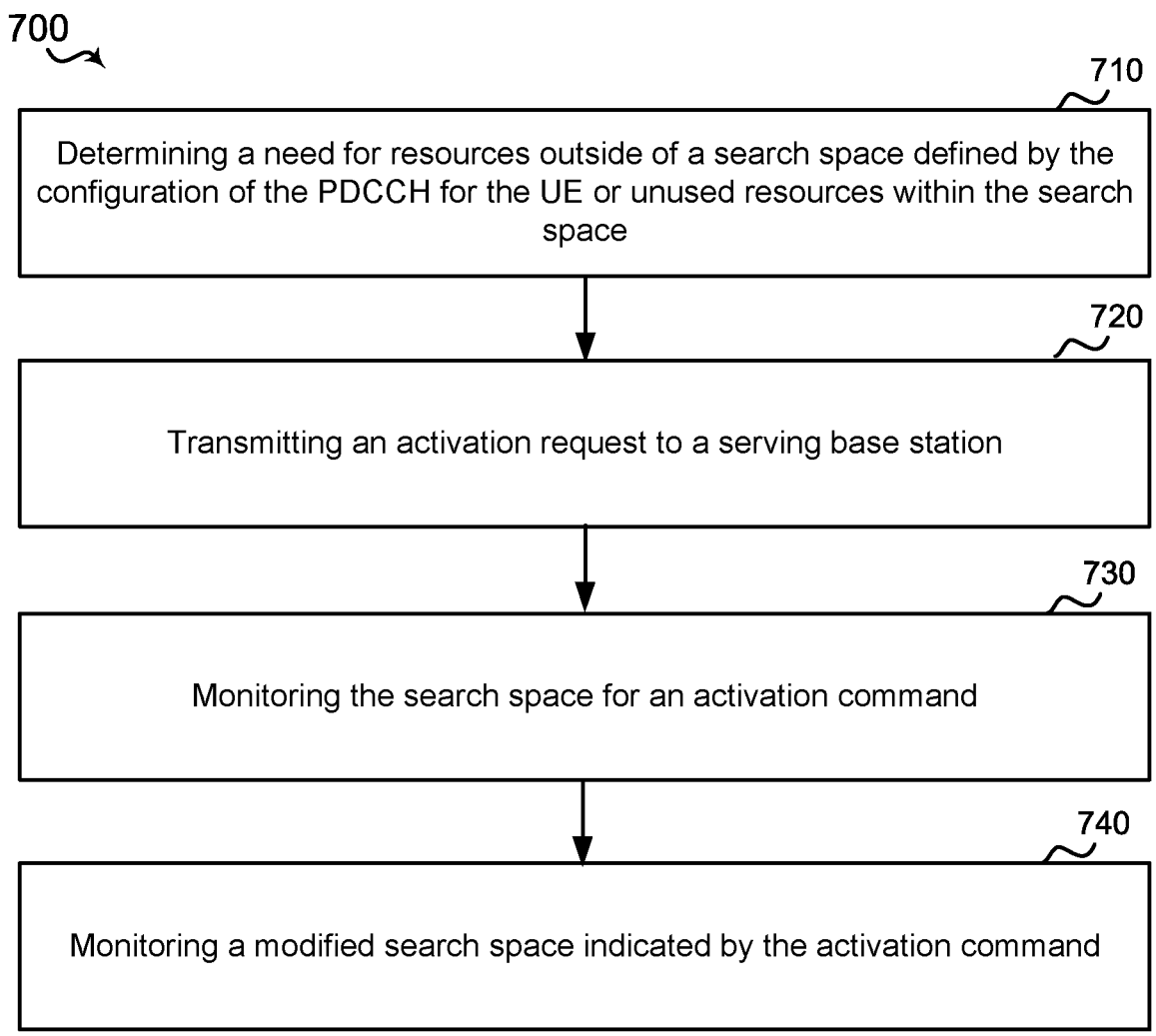
FIG. 7 is a flow diagram of an example of a method of adapting a PDCCH configuration.

Referring to FIG. 7, for example, a method 700 of wireless communication in operating UE 110 is provided for modifying a PDCCH configuration. For example, the method 700 may be used in the block 610 for operating UE 110 according to the above-described aspects to receive a configuration of a PDCCH and may include one or more of the herein-defined actions. Additionally, the actions may be applied to other scenarios for adapting a PDCCH. Other example scenarios that may use the method 700 are described in U.S. patent application Ser. No. 16/404,595, filed on May 6, 2019, titled "DYNAMIC CONTROL CHANNEL MANAGEMENT," which is assigned to the assignee hereof and is incorporated herein by reference.

At block 710, the method 700 may include determining a need for resources outside of a search space defined by the configuration of the PDCCH for the UE or unused resources within the search space. In an aspect, for example, the candidate selection component 154 may determine a need for resources outside of a search space 250 defined by the configuration of the PDCCH 220 for the UE 110 or unused resources within the search space 250. For example, the candidate selection component 154 may determine that a large portion of available PDCCH candidates 252, 254, 256, 258 are being used (e.g., greater than eighty percent) or that an uplink transmit buffer is growing, indicating that additional resources are needed. As another example, the candidate selection component 154 may determine that a small portion of PDCCH candidates 252, 254, 256, 258 (e.g., less than 20 percent in one direction) are being used and determine that there are unused resources within the search space 250.

At block 720, the method 700 may include transmitting an activation request to a serving base station. In an aspect, for example, the configuration component 152 may transmit the activation request to the serving base station 105. The activation request may also be used as a deactivation request. The activation request may include an activation/deactivation indicator that indicates whether the modified search space is to be activated or deactivated. The activation request may include an uplink or downlink indicator that indicates whether the activation request is for an uplink or downlink aspect of the search space (e.g., number of PDCCH candidates). The uplink or downlink indicator may also apply to search spaces that separate the uplink and downlink. The activation request may also include a quantity of the search space. The quantity may indicate the amount of the search space that the UE wants to activate or deactivate. For example, the quantity may be a number of PDCCH candidates or a number of component carriers (CCs), etc. The activation request may also include a type of the search space. Since there are various approaches to reducing the search space, the UE may indicate a preferred technique. For example, the UE 110 may recommend modifying the number of PDCCH candidates (and a certain number of candidates for UL/DL) versus modifying the search space based on the CCs. The quantity may be determined based on the UE battery power status, UL traffic, etc. The quantity may be optional because the UE 110 may recommend a quantity but ultimately the network may decide on how much to modify the search space. The activation request may include, for a timer based activation/deactivation, the recommended value/range of the timer. For example, the recommend value of the inactivity time may be carried in the activation request. The UE 110 may use the timer to deactivate/activate the search space once the timer expires. The activation command may carry a response to the UE 110, letting the UE 110 know if the suggested timer value or range was accepted, modified or rejected by the network and the appropriate timer to use. Other time related parameters such as monitoring periodicity for the search spaces may also be included. Ultimately the network decides on which type approach to take when modifying the search space 250.

The activation request may be conveyed using one of a scheduling request (SR), a buffer status report (BSR) control element (CE), a random access channel (RACH) preamble, a scrambling code on PUCCH/PUSCH, or a MAC payload. The SR is used to request UL resources from the network. The SR bits sent on the PUSCH or PUCCH indicate whether UE has data to send to the network or not. In an aspect, additional bits may be added to the SR to indicate search space activation or deactivation and indicate uplink or downlink direction.

The BSR is a MAC-CE and is sent as a response to the uplink grant triggered by the SR message. The BSR MAC-CE typically contains the logical ID and the UL Buffer size index. In an aspect, the logical ID may be increased in length by one bit and used to indicate an activation request as either activation or deactivation. For example logical ID value 8 may indicate activation and logical ID value 9 may indicate deactivation. The UL buffer size index may be used to indicate UL/DL, the type and quantity of SS to activate/deactivate and timer value/range as shown in Table 1 below. The table may be pre-configured a priori by the network and sent to the UE via RRC signaling. When the UE determines a need to modify the PDCCH while connected to the network, the UE 110 may select preferences using an index and send the preferences to the network via the BSR CE.

TABLE 1

| UL Buffer Size Index | Type/Quantity of SS to Activate/Deactivate or Timer value or range |
|---|---|
| 0 | UL 1 PDCCH Candidate |
| . . . | . . . |
| N | UL max_number_PDCCH_candidates |
| M | DL 1 PDCCH Candidate |
| . . . | . . . |
| S | DL max_number_PDCCH candidates |
| S + 1 | Time range/Value 1 |
| . . . | . . . |
| S + F | Timer range/Value F |

N may be an index indicating a change to the maximum number of uplink PDCCH candidates. M may be an index indicating a change of one downlink PDCCH candidate. S may be an index indicating a change to a maximum number of downlink candidates. Index values greater than S may be used to indicate a preferred timer value, with F being a maximum timer value. A person of ordinary skill in the art would understand that different mappings of index values to preferences may be used.

In an aspect, the UE may send a pre-assigned PRACH preamble to indicate SS activation or deactivation using explicit messaging. One preamble can be assigned for the UL and the other for the DL activation. Additionally, preambles may be assigned for uplink and downlink search space modification according to table 2, for example.

TABLE 2

| Preamble index | Function |
| --- | --- |
| # n | Activation |
| # n + 1 | Deactivation |
| # n + 2 | UL SS Modification |
| # n + 3 | DL SS Modification |

Alternatively, implicitly, when the base station 105 receives an assigned "UL/DL" RACH preamble and the default SS is activated, then the message received may be interpreted as an activation request for a modified SS. When the base station 105 receives an assigned "UL/DL" RACH preamble and a modified SS is activated, then the message received is interpreted as a deactivation request for the modified SS. The assigned RACH preambles may be selected from the reserved preambles for contention free access. The assigned RACH preambles may be derived from a different root sequence from the root sequence(s) used in the cell. When multiple CCs are involved, two preambles may be assigned per carrier.

In an aspect, the UE 110 may indicate a preferred search space using pre-assigned scrambling codes to mask the CRC portion of PUSCH or the PUCCH. The base station 105 may monitor the CRC portion for use of these pre-assigned scrambling codes. An example of the request info is shown in the table 3. The scrambling codes may be derived from the UE C-RNTI.

TABLE 3

| Scrambling Code # | Function |
| --- | --- |
| Scrambling Code 1 | DL Activation |
| Scrambling Code 2 | DL Deactivation |
| Scrambling Code 3 | UL Activation |
| Scrambling Code 4 | UL Deactivation |

In an aspect, the MAC service data unit (SDU) (also referred to as MAC Payload) or UL MAC-CE may carry some or all of the information in the activation request. Using the MAC SDU may also be combined with other techniques such as SR, which may limit transmitted information. For example, if the SR indicates SS activation/deactivation, additional request information may be carried in the MAC SDU. The information in the MAC SDU may be similar to the information carried in the BSR (e.g., Table 1).

At block 730, the method 700 may include monitoring the search space for an activation command. In an aspect, for example, the decoder 156 may monitor the search space for the activation command. In an aspect, the activation command may include an activation/deactivation indicator field indicating whether the modified SS is to be activated or deactivated. The activation command may include SS configuration parameters defined in e.g., 3GPP TS 38.331 v. 15.0 such as a set of configured aggregation levels, DCI sizes, etc. The activation command may include other parameters such as activation/deactivation timer and monitoring periodicity. If search space configurations are pre-configured, only the configuration index of the selected SS (e.g., configuration templates 410, 420, 430) needs to be sent to UE. Activation commands with SS configuration are typically sent via RRC layer signaling. In order to reduce latency, the activation command may be sent at a lower layer. In an aspect, for example, the activation command may be sent by modifying existing DCI format by adding new bit(s) to existing DCI formats (e.g. DCI_0_0 or DCI 1_0). The decoder 156 may decode the DCI to determine the bits according to the modified DCI format. Similarly, the activation command may be decoded from a special DCI format monitored by the UE 110. In another aspect, the activation command may be assigned a special RNTI that the UE would use to monitor PDCCH. When a PDCCH is detected with the special RNTI, the PDCCH candidate adaptation component 150 may trigger an SS modification or revert back to the anchor search space. For example, 3GPP TS 38.321 v. 15.0 defines reserved RNTIs that could be used as the special RNTI. In another aspect, any MAC-CE sent on the DL may be used to carry the activation/deactivation command. This option may allow the activation command to convey additional information compared to the other techniques.

At block 740, the method 700 may include monitoring a modified search space indicated by the activation command. In an aspect, for example, the candidate selection component 154 may determine the modified search space based on the activation command and the decoder 156 may monitor the modified search space indicated by the activation command.

Figure 8:
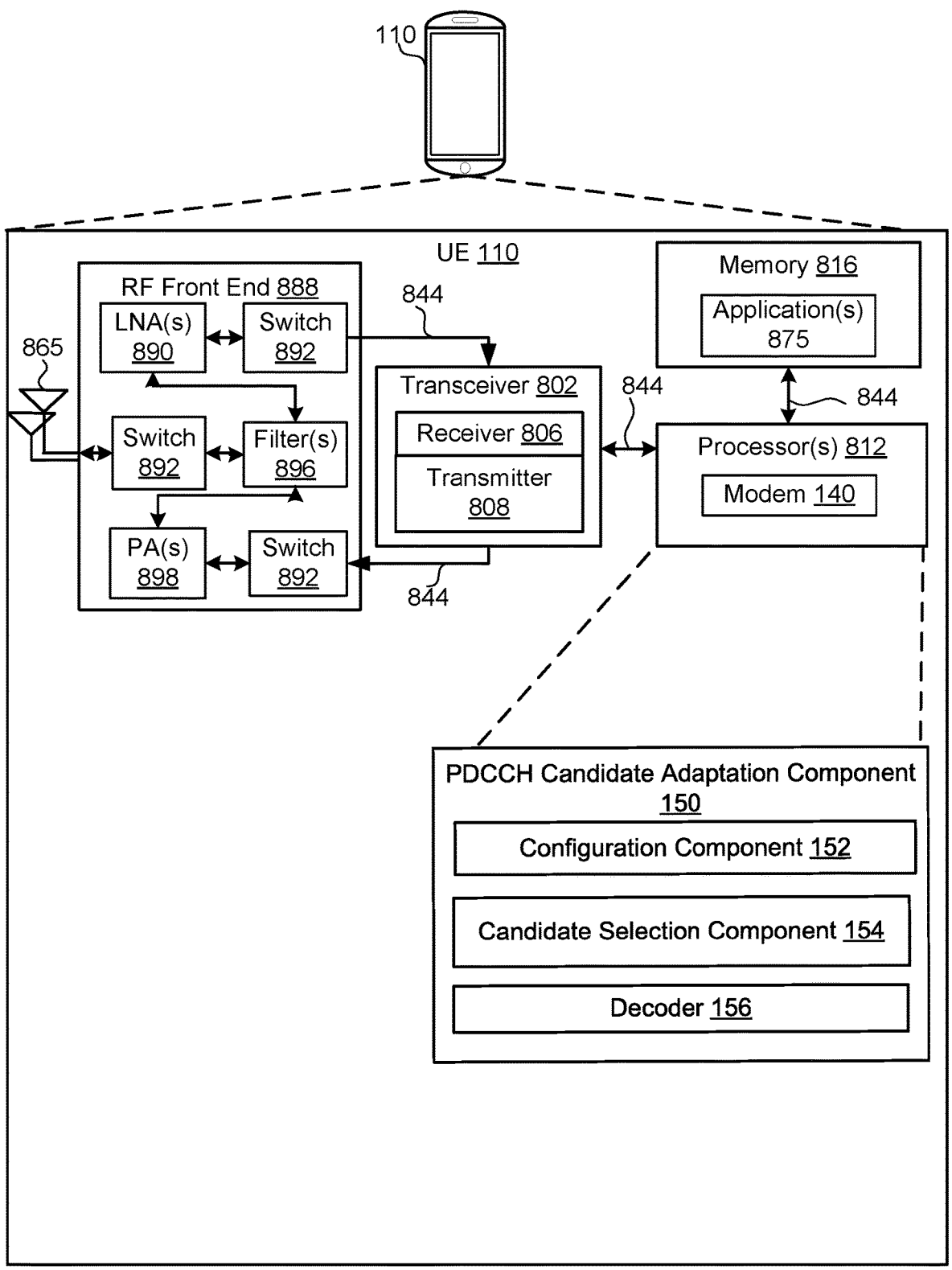
FIG. 8 is a schematic diagram of example components of the UE of FIG. 1.

Referring to FIG. 8, one example of an implementation of UE 110 may include a variety of components, some of which have already been described above, but including components such as one or more processors 812 and memory 816 and transceiver 802 in communication via one or more buses 844, which may operate in conjunction with modem 140 and PDCCH candidate adaptation component 150 to enable one or more of the functions described herein related to adaptive PDCCH configuration. Further, the one or more processors 812, modem 140, memory 816, transceiver 802, RF front end 888 and one or more antennas 865, may be configured to support voice and/or data calls (simultaneously or non-simultaneously) in one or more radio access technologies. The antennas 865 may include one or more antennas, antenna elements, and/or antenna arrays.

In an aspect, the one or more processors 812 can include the modem 140 that uses one or more modem processors. The various functions related to PDCCH candidate adaptation component 150 may be included in modem 140 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 140 associated with PDCCH candidate adaptation component 150 may be performed by transceiver 802.

Also, memory 816 may be configured to store data used herein and/or local versions of applications 875 or PDCCH candidate adaptation component 150 and/or one or more of its subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining PDCCH candidate adaptation component 150 and/or one or more of its subcomponents, and/or data associated therewith, when UE 110 is operating at least one processor 812 to execute PDCCH candidate adaptation component 150 and/or one or more of its subcomponents.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 105. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may including, but is not limited to, an RF transmitter.

Moreover, in an aspect, UE 110 may include RF front end 888, which may operate in communication with one or more antennas 865 and transceiver 802 for receiving and transmitting radio transmissions, for example, wireless communications transmitted by at least one base station 105 or wireless transmissions transmitted by UE 110. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and a corresponding specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 802 to operate at a specified frequency and power level based on the UE configuration of the UE 110 and the communication protocol used by modem 140.

In an aspect, modem 140 can be a multiband-multimode modem, which can process digital data and communicate with transceiver 802 such that the digital data is sent and received using transceiver 802. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 9:
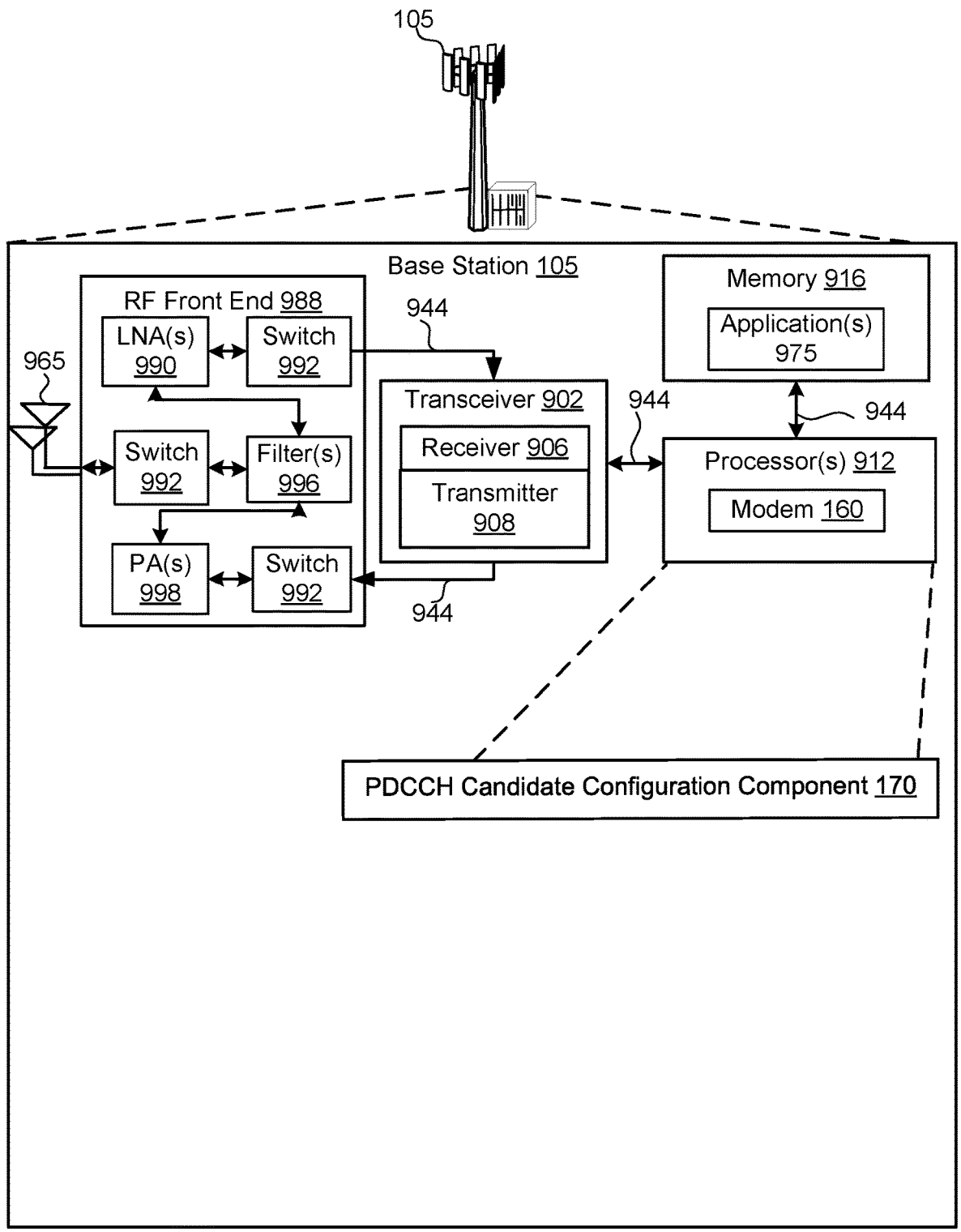
FIG. 9 is a schematic diagram of example components of the base station of FIG. 1.

Referring to FIG. 9, one example of an implementation of base station 105 may include a variety of components, some of which have already been described above, but including components such as one or more processors 912 and memory 916 and transceiver 902 in communication via one or more buses 944, which may operate in conjunction with modem 160 and PDCCH candidate configuration component 170 to enable one or more of the functions described herein related to configuring and transmitting a PDCCH.

The transceiver 902, receiver 906, transmitter 908, one or more processors 912, memory 916, applications 975, buses 944, RF front end 988, LNAs 990, switches 992, filters 996, PAs 998, and one or more antennas 965 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

Some Further Example Embodiments

A first example method of receiving DCI on a PDCCH, comprising: receiving a configuration of the PDCCH; determining a number of downlink PDCCH candidates and a number of uplink PDCCH candidates within a search space based on the configuration, wherein the number of downlink PDCCH candidates is different than the number of uplink PDCCH candidates, and a length of each downlink PDCCH candidate is different than a length of each uplink PDCCH candidate; and blindly decoding the search space with each PDCCH candidate as a hypothesis to determine whether any of the downlink PDCCH candidates or uplink PDCCH candidates decode to a DCI format.

The above first example method, wherein the configuration of the PDCCH specifies a number of downlink PDCCH candidates and a number of uplink PDCCH candidates or a ratio of downlink PDCCH candidates to uplink PDCCH candidates.

Any of the above first example methods, wherein the number of downlink PDCCH candidates and the number of uplink PDCCH candidates indicated by the configuration of the PDCCH is an anchor set of candidates, the method further comprising: determining activation of a second set of candidates; and blindly decoding the second set of candidates in addition to the anchor set of candidates.

Any of the above first example methods, wherein determining activation of the second set of candidates comprises receiving an activation command as one of: a DCI with a format indicating the activation, a RNTI used to scramble a physical channel, or a MAC-CE.

Any of the above first example methods, wherein the activation command is received on a different search space.

Any of the above first example methods, further comprising determining a deactivation of the second set of candidates.

Any of the above first example methods, wherein determining the deactivation is based on an inactivity timer.

Any of the above first example methods, wherein determining the deactivation is based on a deactivation command.

Any of the above first example methods, wherein the configuration includes an indication of a set of predefined templates, each template including a combination of downlink PDCCH candidates and uplink PDCCH candidates, wherein one template of the set of predefined templates is an initial anchor template.

Any of the above first example methods, further comprising receiving an activation command indicating activation of a different template of the set of predefined templates.

Any of the above first example methods, further comprising requesting activation of the different template of the set of predefined templates.

Any of the above first example methods, wherein the activation command indicates activation of two or more templates of the set of predefined templates and a periodic pattern for changing templates.

Any of the above first example methods, further comprising: determining a need for resources outside of the search space defined by the configuration of the PDCCH for the UE or unused resources within the search space; transmitting an activation request to a serving base station; monitoring the search space for an activation command; and monitoring a modified search space indicated by the activation command.

A first example UE for receiving DCI on a PDCCH via wireless communication, comprising: a memory; and a processor in communication with the memory, wherein the processor is configured to: receive a configuration of the PDCCH; determine a number of downlink PDCCH candidates and a number of uplink PDCCH candidates within a search space based on the configuration, wherein the number of downlink PDCCH candidates is different than the number of uplink PDCCH candidates, and a length of each downlink PDCCH candidate is different than a length of each uplink PDCCH candidate; and blindly decode the search space with each PDCCH candidate as a hypothesis to determine whether any of the downlink PDCCH candidates or uplink PDCCH candidates decode to a DCI format.

The above first example UE, wherein the configuration of the PDCCH specifies a number of downlink PDCCH candidates and a number of uplink PDCCH candidates or a ratio of downlink PDCCH candidates to uplink PDCCH candidates.

Any of the above first example UEs, wherein the number of downlink PDCCH candidates and the number of uplink PDCCH candidates indicated by the configuration of the PDCCH is an anchor set of candidates, wherein the processor is configured to: determine activation of a second set of candidates; and blindly decode the second set of candidates in addition to the anchor set of candidates.

Any of the above first example UEs, wherein the processor is configured to receive an activation command as one of: a DCI with a format indicating the activation, a radio network temporary identifier (RNTI) used to scramble a physical channel, or a media access control (MAC) control element (MAC-CE).

Any of the above first example UEs, wherein the activation command is received on a different search space.

Any of the above first example UEs, wherein the processor is configured to determine a deactivation of the second set of candidates.

Any of the above first example UEs, wherein the processor is configured to determine the deactivation based on an inactivity timer.

Any of the above first example UEs, wherein the processor is configured to determine the deactivation based on a deactivation command.

Any of the above first example UEs, wherein the configuration includes an indication of a set of predefined templates, each template including a combination of downlink PDCCH candidates and uplink PDCCH candidates, wherein one template of the set of predefined templates is an initial anchor template.

Any of the above first example UEs, wherein the processor is configured to receive an activation command indicating activation of a different template of the set of predefined templates.

Any of the above first example UEs, wherein the processor is configured to request activation of the different template of the set of predefined templates.

Any of the above first example UEs, wherein the activation command indicates activation of two or more templates of the set of predefined templates and a periodic pattern for changing templates.

Any of the above first example UEs, wherein the processor is configured to: determine a need for resources outside of the search space defined by the configuration of the PDCCH for the UE or unused resources within the search space; transmit an activation request to a serving base station; monitor the search space for an activation command; and monitor a modified search space indicated by the activation command.

A second example UE for receiving DCI on a PDCCH via wireless communication, comprising: means for receiving a configuration of the PDCCH; means for determining a number of downlink PDCCH candidates and a number of uplink PDCCH candidates within a search space based on the configuration, wherein the number of downlink PDCCH candidates is different than the number of uplink PDCCH candidates, and a length of each downlink PDCCH candidate is different than a length of each uplink PDCCH candidate; and means for blindly decoding the search space with each PDCCH candidate as a hypothesis to determine whether any of the downlink PDCCH candidates or uplink PDCCH candidates decode to a DCI format.

The above second example UE, wherein the number of downlink PDCCH candidates and the number of uplink PDCCH candidates indicated by the configuration of the PDCCH is an anchor set of candidates, the second example UE further comprising means for determining activation of a second set of candidates, wherein the means for blindly decoding the search space is configured to blindly decode the second set of candidates in addition to the anchor set of candidates.

Any of the above second example UEs, further comprising means for requesting activation of a template including a combination of downlink PDCCH candidates and uplink PDCCH candidates.

An example non-transitory computer-readable medium storing computer code executable by a processor for receiving DCI on a PDCCH via wireless communications, comprising code to: receive a configuration of the PDCCH; determine a number of downlink PDCCH candidates and a number of uplink PDCCH candidates within a search space based on the configuration, wherein the number of downlink PDCCH candidates is different than the number of uplink PDCCH candidates, and a length of each downlink PDCCH candidate is different than a length of each uplink PDCCH candidate; and blindly decode the search space with each PDCCH candidate as a hypothesis to determine whether any of the downlink PDCCH candidates or uplink PDCCH candidates decode to a DCI format.

A second example method of wireless communications for determining a change to a configuration of a physical downlink control channel (PDCCH) for a UE, comprising: determining a need for resources outside of a search space defined by the configuration of the PDCCH for the UE or unused resources within the search space; transmitting an activation request to a serving base station; monitoring the search space for an activation command; and monitoring a modified search space indicated by the activation command.

The above second example method, wherein the search space identifies physical resource blocks to receive.

Any of the above second example methods, wherein the search space identifies a number of PDCCH candidates to use for blindly decoding the PDCCH.

Any of the above second example methods, wherein the activation request includes an indicator of whether the modified search space is to be activated or deactivated and an indicator of whether the modification is for an uplink direction or downlink direction.

The above second example method, wherein the activation request further includes one or more of: a number of PDCCH candidates or component carriers to activate, a type of modification to the search space, or a duration for the modification to be in effect.

Any of the above second example methods, wherein transmitting the activation request comprises transmitting a scheduling request including a bit indicating search space activation or deactivation and a bit indicating an uplink or downlink direction.

Any of the above second example methods, wherein transmitting the activation request comprises transmitting a buffer status report (BSR) control element (CE) including a logical ID modified from a logical ID of the UE and an uplink buffer size field indicating one or more of an uplink or downlink direction, a type of modification to the search space, a quantity of a number of PDCCH candidates or component carriers to activate or deactivate, or a duration for the modification to be in effect.

Any of the above second example methods, wherein transmitting the activation request comprises transmitting one of a number of random access preambles defined to indicate a modification to the search space.

Any of the above second example methods, wherein transmitting the activation request comprises using a pre-assigned scrambling code to mask a CRC portion of a PUSCH or a PUCCH.

Any of the above second example methods, wherein transmitting the activation request comprises transmitting a MAC SDU including a payload indicating a modification to the search space.

Any of the above second example methods, wherein the activation command includes an indicator of whether the modified search space is to be activated or deactivated and a configuration of the modified search space.

Any of the above second example methods, wherein monitoring the search space for the activation command comprises receiving a DCI according to a format including one or more bits indicating whether the modified search space is to be activated or deactivated and the configuration of the modified search space.

Any of the above second example methods, wherein monitoring the search space for the activation command comprises monitoring the PDCCH using a second RNTI.

Any of the above second example methods, wherein monitoring the search space for the activation command comprises receiving a MAC-CE.

A third example UE for receiving DCI on a PDCCH via wireless communication, comprising: a memory; and a processor in communication with the memory, wherein the processor is configured to perform any of the above second example methods.

A fourth example UE for receiving DCI on a PDCCH via wireless communication, comprising: means for performing any of the above second example methods.

An example non-transitory computer-readable medium storing computer code executable by a processor for receiving DCI on a PDCCH via wireless communications, comprising code to perform any of the above second example methods.

What is claimed is:

1. A method of receiving downlink control information (DCI) on a physical downlink control channel (PDCCH), comprising:
    receiving a configuration of the PDCCH;
    determining a number of downlink PDCCH candidates and a number of uplink PDCCH candidates within a single search space based on the configuration, wherein the number of downlink PDCCH candidates is different than the number of uplink PDCCH candidates, and a length of a downlink DCI format for each downlink PDCCH candidate is different than a length of an uplink DCI format for each uplink PDCCH candidate; and
    blindly decoding the single search space with each downlink PDCCH candidate and each uplink PDCCH candidate as a hypothesis to determine whether any of the downlink PDCCH candidates or the uplink PDCCH candidates decode to a DCI format.

2. The method of claim 1, wherein the configuration of the PDCCH specifies the number of downlink PDCCH candidates and the number of uplink PDCCH candidates or a ratio of downlink PDCCH candidates to uplink PDCCH candidates.

3. The method of claim 1, wherein the number of downlink PDCCH candidates and the number of uplink PDCCH candidates indicated by the configuration of the PDCCH is an anchor set of candidates, the method further comprising:
    determining an activation of a second set of candidates; and
    blindly decoding the second set of candidates in addition to the anchor set of candidates.

4. The method of claim 3, wherein determining the activation of the second set of candidates comprises receiving an activation command as one of:
    a DCI with a format indicating the activation,
    a radio network temporary identifier (RNTI) used to scramble a physical channel, or
    a media access control (MAC) control element (MAC-CE).

5. The method of claim 4, wherein the activation command is received on a different search space.

6. The method of claim 3, further comprising determining a deactivation of the second set of candidates.

7. The method of claim 6, wherein determining the deactivation is based on an inactivity timer.

8. The method of claim 6, wherein determining the deactivation is based on a deactivation command.

9. The method of claim 1, wherein the configuration includes an indication of a set of predefined templates, each template including a number of downlink PDCCH candidates and a number of uplink PDCCH candidates at different aggregation levels within the single search space, wherein one template of the set of predefined templates is an initial anchor template.

10. The method of claim 9, further comprising receiving an activation command indicating an activation of a different template of the set of predefined templates, the different template including a different number of downlink PDCCH candidates or a different number of uplink PDCCH candidates at one or more of the different aggregation levels within the single search space.

11. The method of claim 10, further comprising requesting the activation of the different template of the set of predefined templates.

12. The method of claim 10, wherein the activation command indicates an activation of two or more templates of the set of predefined templates and a periodic pattern for changing templates.

13. The method of claim 1, further comprising:
    determining a need for resources outside of the search space defined by the configuration of the PDCCH for a UE or unused resources within the search space;
    transmitting an activation request to a serving base station;

monitoring the search space for an activation command; and monitoring a modified search space indicated by the activation command.

14. The method of claim 13, wherein the activation request further includes one or more of:
   a number of PDCCH candidates or component carriers to activate,
   a type of modification to the search space, or
   a duration for the modification to be in effect.

15. The method of claim 14, wherein transmitting the activation request comprises transmitting a scheduling request including a bit indicating search space activation or deactivation and a bit indicating an uplink or downlink direction.

16. A user equipment (UE) for receiving downlink control information (DCI) on a physical downlink control channel (PDCCH) via wireless communication, comprising:
   a memory; and
   a processor in communication with the memory, wherein the processor is configured to:
      receive a configuration of the PDCCH;
      determine a number of downlink PDCCH candidates and a number of uplink PDCCH candidates within a single search space based on the configuration, wherein the number of downlink PDCCH candidates is different than the number of uplink PDCCH candidates, and a length of a downlink DCI format for each downlink PDCCH candidate is different than a length of an uplink DCI format for each uplink PDCCH candidate; and
      blindly decode the single search space with each downlink PDCCH candidate and each uplink PDCCH candidate as a hypothesis to determine whether any of the downlink PDCCH candidates or the uplink PDCCH candidates decode to a DCI format.

17. The UE of claim 16, wherein the configuration of the PDCCH specifies the number of downlink PDCCH candidates and the number of uplink PDCCH candidates or a ratio of downlink PDCCH candidates to uplink PDCCH candidates.

18. The UE of claim 16, wherein the number of downlink PDCCH candidates and the number of uplink PDCCH candidates indicated by the configuration of the PDCCH is an anchor set of candidates, wherein the processor is configured to:
   determine activation of a second set of candidates; and
   blindly decode the second set of candidates in addition to the anchor set of candidates.

19. The UE of claim 18, wherein the processor is configured to receive an activation command for the second set of candidates as one of:
   a DCI with a format indicating the activation,
   a radio network temporary identifier (RNTI) used to scramble a physical channel, or
   a media access control (MAC) control element (MAC-CE).

20. The UE of claim 19 wherein the activation command is received on a different search space.

21. The UE of claim 18, wherein the processor is configured to determine a deactivation of the second set of candidates based on an inactivity timer or a deactivation command.

22. The UE of claim 16, wherein the configuration includes an indication of a set of predefined templates, each template including a number of downlink PDCCH candidates and a number of uplink PDCCH candidates at different aggregation levels within the single search space, wherein one template of the set of predefined templates is an initial anchor template.

23. The UE of claim 22, wherein the processor is configured to receive an activation command indicating an activation of a different template of the set of predefined templates, the different template including a different number of downlink PDCCH candidates or a different number of uplink PDCCH candidates at one or more of the different aggregation levels within the single search space.

24. The UE of claim 23, wherein the processor is configured to request the activation of the different template of the set of predefined templates.

25. The UE of claim 23, wherein the activation command indicates an activation of two or more templates of the set of predefined templates and a periodic pattern for changing templates.

26. The UE of claim 16, wherein the processor is configured to:
   determine a need for resources outside of the search space defined by the configuration of the PDCCH for the UE or unused resources within the search space;
   transmit an activation request to a serving base station;
   monitor the search space for an activation command; and
   monitor a modified search space indicated by the activation command.

27. A user equipment (UE) for receiving downlink control information (DCI) on a physical downlink control channel (PDCCH) via wireless communication, comprising:
   means for receiving a configuration of the PDCCH;
   means for determining a number of downlink PDCCH candidates and a number of uplink PDCCH candidates within a single search space based on the configuration, wherein the number of downlink PDCCH candidates is different than the number of uplink PDCCH candidates, and a length of a downlink DCI format for each downlink PDCCH candidate is different than a length of an uplink DCI format for each uplink PDCCH candidate; and
   means for blindly decoding the single search space with each downlink PDCCH candidate and each uplink PDCCH candidate as a hypothesis to determine whether any of the downlink PDCCH candidates or the uplink PDCCH candidates decode to a DCI format.

28. The UE of claim 27, wherein the number of downlink PDCCH candidates and the number of uplink PDCCH candidates indicated by the configuration of the PDCCH is an anchor set of candidates, wherein the means for receiving the configuration of the PDCCH is configured to determine an activation of a second set of candidates, wherein the means for blindly decoding the search space is configured to blindly decode the second set of candidates in addition to the anchor set of candidates.

29. The UE of claim 27, wherein the means for receiving the configuration of the PDCCH is configured to request activation of a template including a combination of downlink PDCCH candidates and uplink PDCCH candidates.

30. A non-transitory computer-readable medium storing computer code executable by a processor for receiving downlink control information (DCI) on a physical downlink control channel (PDCCH) via wireless communications, comprising code to:
   receive a configuration of the PDCCH;
   determine a number of downlink PDCCH candidates and a number of uplink PDCCH candidates within a single search space based on the configuration, wherein the number of downlink PDCCH candidates is different than the number of uplink PDCCH candidates, and a length of a downlink DCI format for each downlink PDCCH candidate is different than a length of an uplink DCI format for each uplink PDCCH candidate; and blindly decode the single search space with each downlink PDCCH candidate and each uplink PDCCH candidate as a hypothesis to determine whether any of the downlink PDCCH candidates or the uplink PDCCH candidates decode to a DCI format.

* * * * *